United States Patent
Dimeff

[19]

[11] Patent Number: 5,481,201
[45] Date of Patent: Jan. 2, 1996

[54] CIRCUIT FOR GENERATING A CURRENT LINEARLY PROPORTIONAL TO DISPLACEMENT OF A MOVABLE MEMBER

[76] Inventor: John Dimeff, 5346 Greenside Dr., San Jose, Calif. 95127

[21] Appl. No.: 44,020

[22] Filed: Apr. 8, 1993

[51] Int. Cl.[6] ............................................. G01B 7/18
[52] U.S. Cl. .................... 324/720; 324/714; 73/765
[58] Field of Search ........................... 324/130, 601, 324/611, 662, 706, 720, 713, 714; 73/765, 769, 204.18, 862.622, 862.625, 862.628, 708; 374/172; 364/571.01

[56] References Cited

U.S. PATENT DOCUMENTS

| | | | |
|---|---|---|---|
| 3,906,338 | 9/1975 | Grindheim | 374/172 |
| 4,362,060 | 12/1982 | Okayama et al. | 73/708 |
| 4,419,620 | 12/1983 | Kurtz et al. | 323/280 |
| 4,492,122 | 1/1985 | Dimeff | 73/708 |
| 4,550,611 | 11/1985 | Czarnocki | 73/708 |
| 5,122,756 | 6/1992 | Nelson | 324/720 |

*Primary Examiner*—Kenneth A. Wieder
*Assistant Examiner*—Christopher M. Tobin
*Attorney, Agent, or Firm*—Robert S. Kelly

[57] ABSTRACT

A circuit for generating a linear current proportional to the displacement of the movable member of a transducer receives an undetermined supply voltage from a monitoring circuit which has a relatively high internal resistance. The circuit is provided with two parallel current paths with one path including a resistive potentiometer strip and other path including a transistor and resistor connected in series. The movable member of the transducer has an electrical contact member attached thereto with the contact member having one end making contact with the resistive potentiometer strip and with the other end thereof making contact with a conductive strip which is connected to the gate of the transistor so that the current drawn by the circuit will be linearly related to the movement of the movable member.

19 Claims, 1 Drawing Sheet

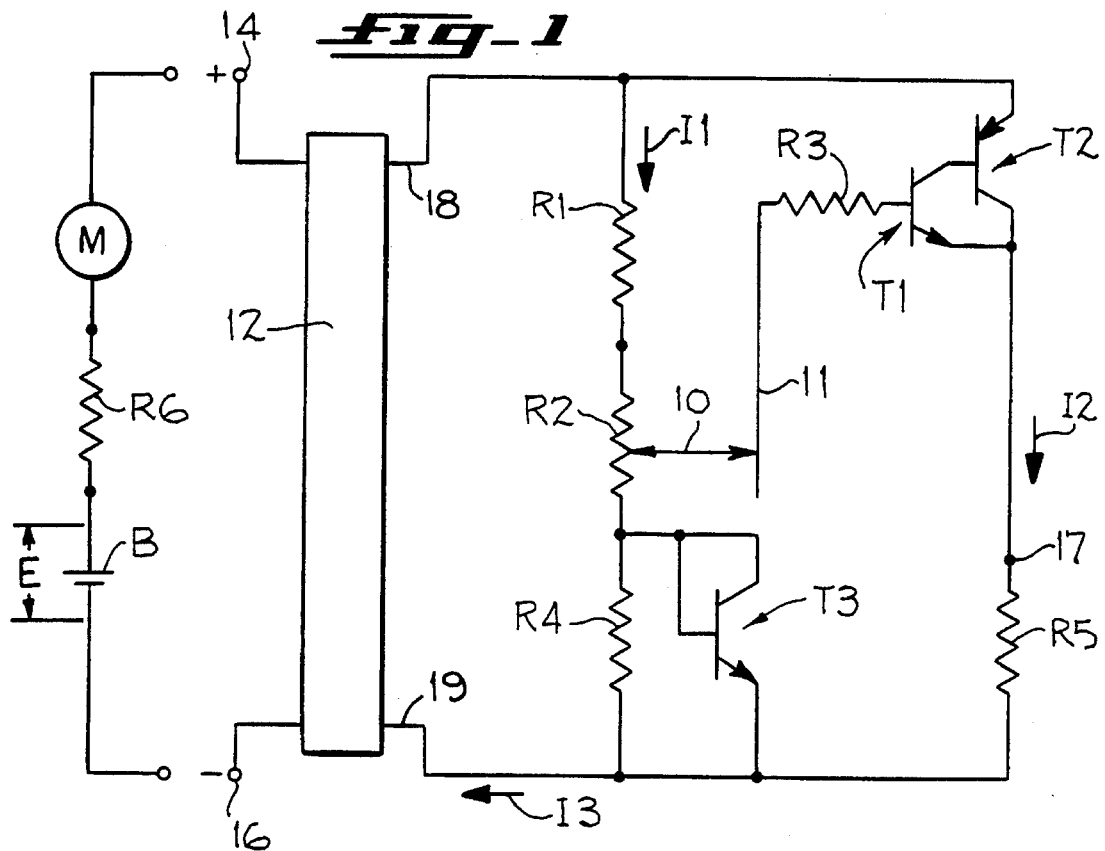
fig_1
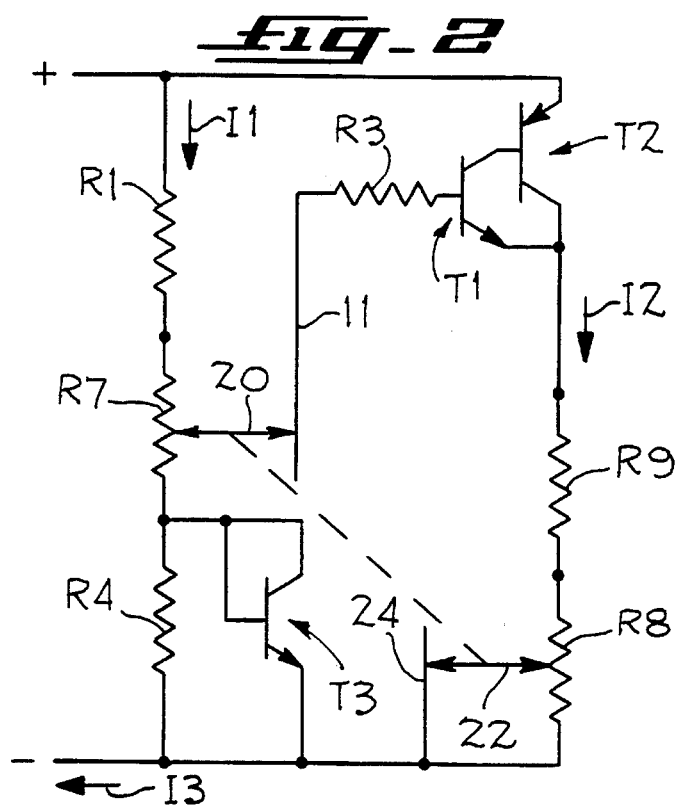
fig_2

CIRCUIT FOR GENERATING A CURRENT LINEARLY PROPORTIONAL TO DISPLACEMENT OF A MOVABLE MEMBER

BACKGROUND OF THE INVENTION

1. Field of the Invention

The present invention pertains to resistive potentiometer circuitry, and more particularly, it pertains to resistive potentiometer circuitry for generating a current linearly proportional to the displacement of a movable member.

2. Description of the Prior Art

Transducers for measuring pressure, temperature, or flow rates of fluids are often distributed at periodic intervals along a system of conduits and are arranged to be interrogated from a remote central location where the status of the overall system can be continuously monitored and analyzed. Because of the vast number of transducers required in many of such systems, emphasis in the design of such transducers and the circuitry therefor is placed upon simplicity, compactness and low cost of manufacture. The design of the transducers is further complicated by the existence of miles of wiring between the transducers and the central monitoring equipment, the large internal resistance inherent in the remotely located monitoring equipment, the need to minimize total current supplied to the transducer circuitry, and the need to conserve the number of wires dedicated to the transducers.

Gas flow and pressure transducers used by telephone companies provide a typical example of the aforementioned types of transducers and associated electrical circuitry. In order to prevent moisture damage to telephone cables, such cables are typically filled with dry air under pressure. In the event of a small break in the waterproof conduit surrounding the telephone wires, the pressurized dry air flows outwardly through the break to both prevent water penetration and to continually dry the broken surfaces. Transducers spaced along the length of the telephone cables continuously measure the pressure therein to insure the adequacy of the pressure to provide the appropriate protection to the telephone wires, and other transducers continuously measure the flow rate at various spaced positions along the cables in order to determine the location and severity of any breaks in the cable. Because of the long distances involved in a typical network of telephone cables, reasonable accuracy in the readings provided by the transducer outputs requires that the influence of the long interconnecting wire be minimized, that the currents drawn from the central monitoring equipment by the transducers be minimized, that minimum signals be provided in the absence of a stimulus at the transducer to permit the monitoring equipment to establish the integrity of the transducer circuitry connection, and that maximum output signals from the transducer circuitry be limited to avoid a condition that might be interpreted as a short. Such requirements have rendered it difficult to produce a simple, low cost potentiometer type circuit to provide the requisite current signals.

In order to meet their specific requirements, the telephone companies utilizing the aforedescribed transducer monitoring systems specify that the transducer circuitry present a resistance varying in accordance with the following equation:

$$R=(3.9-1.9X)/(1+19X)$$

where R is expressed in Megohms and X is the ratio of the applied stimulus (gas flow through the transducer or gauge pressure applied to the transducer) to the stimulus required to evoke a full scale response from the transducer. This equation can be separated into fixed and variable components to give the equation $$R=0.1+r=0.1+3.8(1-X)/(1=19X)$$

where r is the variable component. From the foregoing, it will be apparent that small changes in stimulus (increased flow or increased pressure) produce very much larger changes in transducer resistance when the percentage of total movement is small then will be produced when the percentage of total movement is large. That is to say, with pressures or flow rates near zero, small increments of change produce greater changes in resistance than when the flow rates or pressures are near their maximum values. Thus, the requirement for a linear output current proportional to the flow rate or pressure has proven difficult to achieve with conventional off-the-shelf circuitry or with easily manufactured elements.

Another factor limiting the design of a resistive potentiometer element for the foregoing requirements is the desirability of point contact between the movable and fixed elements of the potentiometer in order to minimize frictional forces in the transducer and hence prevent inaccurate readings.

Because of the extreme differences in the responses required at the opposite ends of the scale, currently available continuously variable resistive potentiometer elements have not been found to be acceptable. Thus, telephone companies typically use stepped variable resistors to approximate the required response in constructing their variable resistor circuitry. In such arrangements, however, accuracy suffers due to the use of step changes to approximate separate sections of the response curve.

SUMMARY OF THE INVENTION

With the circuitry of the present invention, telephone companies or others operating under the aforedescribed constraints or similar constraints, can obtain a linear current signal directly proportional to the displacement of the movable member in a transducer such as a pressure meter or gas flow meter. Furthermore, the resistance R presented by such circuitry to the monitoring circuitry will precisely approximate the variable resistance R as indicated in the foregoing equations. The construction of such circuitry is relatively simple, and it may be manufactured at relatively low cost. However, in contrast with the prior art circuitry, it does not suffer from the inaccuracies due to the approximations required by the aforementioned stepped resistor type of devices.

The circuitry of the present invention operates solely upon the voltage supplied from the remote monitoring source and includes a resistive potentiometer strip which may be formed of a thin layer of conductive material deposited on a pc board using conventional manufacturing processes. A point contact slider, or a slider with contact on a very small area, is attached to the movable portion of the transducer and is utilized to make contact with the resistive potentiometer strip to minimize frictional forces.

In the circuitry of the present invention, the resistive potentiometer strip is connected between the leads from the remote monitoring equipment. The slider makes contact with the resistive potentiometer strip at one end thereof, and the opposite end of the slider makes contact engagement with a fixed conductor strip. A transistor is connected at its current input to one of the monitor leads and at its current output through a resistor to the other of the monitor leads with the gate of the transistor being connected to the fixed conductor strip. Thus, the measured current to the monitor will be divided between two parallel paths—the resistive potentiometer strip element path and the transistor-resistor path. As the slider moves up on the resistive potentiometer strip during increased stimulus to the transducer (i.e., increased pressure or increased gas flow) the voltage across the resistive potentiometer strip will decrease as additional current is drawn through the transistor-resistor path and through the source resistance. In this manner the overall current output drawn from a monitor with relatively large internal resistance can be made linear while using a conventional or readily manufacturable resistive potentiometer strip.

BRIEF DESCRIPTION OF THE DRAWINGS

FIG. 1 illustrates a first embodiment of the linear current generating circuitry of the present invention and further illustrates a typical remote monitoring circuit to which it is adapted to be selectively connected.

FIG. 2 illustrates a second embodiment of the linear current generating circuitry of the present invention.

DESCRIPTION OF THE PREFERRED EMBODIMENT

Referring first to FIG. 1, the circuitry of the present invention will be seen to include a pair of input terminals 14 (positive) and 16 (negative) which are adapted to receive a dc voltage from remote monitoring circuitry which includes a meter M, a battery B producing a voltage E, and a relatively large internal resistance R6. The circuitry of the present invention provides a current (indicated as I3) to such monitoring circuitry that is linearly proportional to the amount of movement of the movable portion of the transducer associated with the circuitry. The input leads 14, 16 are connected to the remainder of the circuitry through a conventional full-wave rectifier 12 and leads 18 (positive) and 19 (negative). The rectifier 12 operates solely to insure that the polarity of the voltage applied to the leads 18, 19 remains as aforedescribed even if the monitoring circuitry is inadvertently connected to leads 14, 16 in reverse.

In the circuitry of the present invention it is important that two parallel current paths are provided. First, a current path (indicated by current I1) is provided through a fixed resistor R1, a resistive potentiometer strip R2, and another fixed resistor R4 connected in parallel with a transistor T3. A second current path (indicated by current I2) is provided through a pair of transistors T1 and T2 and a resistor R5. The two current paths I1 and I2 are connected so that the currents flow from the positive input terminal 18, separately through the two paths, and then combine as current I3 to return to the negative terminal 19.

A slider, or movable contactor, 10 is attached to the movable member of the transducer and links the two current paths. As can be seen from FIG. 1, the contactor 10 is adapted to make sliding contact with the resistive potentiometer strip R2 and simultaneous sliding contact with a fixed conductor strip 11. The fixed conductor strip applies the voltage from the slider 10 to the base of transistor T1 through a current-limiting resistor R3 to turn the transistor T1 on. Since it will be seen that transistor T1 is an NPN transistor with its collector connected to the base of PNP transistor T2 and that the emitter of T1 and the collector of T2 are connected to the resistor R5, the turning on of transistor T1 causes current I2 to flow through the transistor pair and resistor R5. It will be noted that as the slider rises on resistive potentiometer strip R2 the voltage thereon increases. Increasing the drive to the transistor T1 and, consequently, increasing the current I2. In the arrangement of the present invention the contactor 10 is mounted so that the contact point is at the lowermost end of the resistive strip R2 when the movable element of the mechanical transducer assembly is at its initial rest or unstimulated position, e.g., no flow of gas to move a piston or like element sensitive to gas flow or gas pressure. As the stimulus (pressure, flow) causes the movable member to move, the contactor 10 moves correspondingly and is designed to reach the top end of the resistive strip when the stimulus reaches its maximum value.

While the circuitry of the present invention is adaptable for use with a wide variety of mechanical transducer assemblies, a particularly useful assembly is disclosed in my copending United States patent application entitled "Gas Flow Meter", Ser. No. 44,021, now U.S. Pat. No. 5,337,617, and filed on even date herewith. In the apparatus shown in this patent application the movable contactor 10 comprises a narrow U-shaped metallic member with one of its legs adapted to make sliding, essentially point contact with a resistive potentiometer strip deposited on one side of a pc card and with the other leg of the contactor adapted to make sliding, essentially point contact with a conductive strip deposited on the opposite side of the pc card. The disclosure of the foregoing copending patent application is hereby specifically incorporated by reference herein for a further description and illustration of the contactor 10, resistive strip R2 and the conductive strip 11.

The purpose of the transistors T1 and T2 is to limit the current drawn from R2 through the contactor 10 and to force the end of resistor R5 (at point 17) to the same voltage level as that of the contactor 10. The purpose of the resistor R4 and transistor T3 is to provide a small voltage drop at the bottom end of resistive strip R2 when the contactor 10 is at its lowermost position so that the transistor will be at the threshold level of turning on and causing current to flow in R5 wherein any movement of contactor 10 will cause such current to flow. This threshold voltage is adjusted over a small range by choosing the value of R4, but will be largely determined by T3, and such voltage will remain reasonably constant and independent of variations in the supply voltage at the input terminals. Since this voltage will be very small (in the order of 0.4 to 0.6 volts) as compared to the voltage E (20–40 volts in the example given) so that its effect upon the analysis of circuit behavior can be ignored without introducing a significant error in the results.

It can be shown by conventional circuit analysis techniques that the total current I3 drawn by the circuitry is $$I3=E(R5+KR2)/[R5(R1+R2)+R6(R5+KR2)]$$

where R6 is the internal resistance in the monitoring circuit, E is the source voltage (FIG. 1), and K is the ratio of the distance of the contactor from the lower end of the resistive strip to the total length of the strip.

The values of R1, R2 and R6 are chosen to fit the particular application. In the foregoing example of the transducer circuitry for telephone companies monitoring the pressure and flow of air in telephone cables where R6 is 0.1 Megohms, the sum of R1 and R2 must be 3.9 Megohms to meet the requirements when K=0, and the current drawn (I3) when a full scale stimulus is applied (i.e., K=1) must be the same as would be drawn by a 0.1 Megohm resistor connected across the input terminals 14, 16. The ratio of R2 to R1 can be arbitrarily chosen to accommodate the art of depositing resistive film to form reliable and accurate potentiometer elements since the resistive strip R2 will be formed in this way. The ratio is also chosen to limit the maximum voltage applied to the transistors T1 and T2. In the example given, R1 is chosen to be 1.9 Megohms and R2 to be 2.0 Megohms. In view of such element values, the current I3, in microamps is readily derived as $$I3=(E/4)(1+19X)$$

where X is the ratio of the applied stimulus to the stimulus required for full-scale response. Equating the above equation with the previous equation for I3 gives the equation $$K=R5[(1+19X)(R1+R2+R6)-4]/[4-R6(1+19X)]$$

Inserting the values for the resistive elements R1 and R2 allows one to calculate the value of resistor R5 required to produce the designated current I3 when a full scale stimulus is applied (i.e., X=1). Using the value of 0.0526 Megohms for R5 obtained from the above process and the previously obtained values for R1 and R2 leads to the equation $$K=2X/(3.9-1.9X)$$

assuming that the motion of the contactor 10 is linearly related to the stimulus, i.e., the gas flow or gas pressure. Inserting the value of X, the fraction of full scale stimulus applied to the transducer, and differentiating the above equation gives us the equation $$dX/dK=(3.9-1.9X)^2/7.8$$

and also allows us to calculate a parameter proportional to the width of a resistive element formed by a deposited film of uniform composition used to manufacture the resistive potentiometer element R2.

Thus, the resistive element R2 may be formed of a thin layer of resistive material deposited on a pc card at a given thickness and shaped in the direction of movement of the slider 10 so as to be dimensionally non-uniform in the direction of movement of the slider and so as to provide the requisite resistances above and below the slider as the slider moves therealong. By using the foregoing equation, the width of element R2 at various lengths therealong (0 length being the bottom of the strip R2) has been calculated as follows for the particular example given:

It is to be noted further that the current state of the art provides resistive elements that are sensitive to temperature and resistive elements that are sensitive to pressure. Mounting such elements in parallel or in series combination with resistor R1 and/or R2 provides those skilled in the art the means necessary to correct the transducer response for the effects of temperature and pressure of a gas on the pressure difference created by the flow of the gas through a structure of given geometry.

A second embodiment of the invention is shown in FIG. 2 where like elements to the embodiment of FIG. 1 have been given like reference numbers. In the second embodiment two sliders 20 and 22 have been substituted for the single slider 10 of the FIG. 1 embodiment and two resistive potentiometer strips R7 and R8 are used instead of the single strip R2. The sliders 20 and 22 are mechanically connected together to move simultaneously. A resistor R9 is used in the transistor path (current I2) of the circuit. It is clear that an incremental motion of slider 20 along resistive potentiometer strip R7 will cause an incremental voltage to be applied to the base of transistor T1 which, in turn, will cause an incremental change in the current I2. It will also be appreciated that when sliders 20 and 22 are disposed at their lowermost positions said incremental current is limited by the sum of resistor R9 and the full amount of the resistance of strip R8 while the incremental current change in I2 imposed by incremental motion of sliders 20 and 22 when they are disposed near their uppermost positions will be limited only by the resistor R9. It can be shown by conventional circuit analysis techniques that proper choice of the magnitudes of resistances R1, R7, R8 and R9 allow the output current I3 of FIG. 2 to duplicate the performance of the circuit of FIG. 1 while using linear, untapered resistive potentiometer strips R7 and R8.

From the foregoing a simplified circuit is provided which can meet the requirements of providing a linear transducer signal to distant monitoring circuitry having a relatively high internal resistance. The resistive potentiometer element or elements of the circuit of the present invention allow the use of film deposition methods within the current state of the art which, in turn, allows simplification of the mechanical construction of the transducer and the associated electrical circuit construction.

Although the best modes contemplated for carrying out the present invention have been herein shown and described, it will be apparent that other modifications and variations may be made without departing from what is regarded to be the subject matter of the invention.

| Length, Inches | 0 | 0.15 | 0.30 | 0.45 | 0.60 | 0.75 | 0.90 | 1.05 | 1.20 | 1.35 | 1.50 |
|---|---|---|---|---|---|---|---|---|---|---|---|
| Width, Inches | .365 | .331 | .248 | .267 | .237 | .209 | .183 | .154 | .136 | .115 | .096 |

It will also be noted that the voltage appearing across resistor R5 is proportional to the difference between the total current flow I3 and the initial current flowing in R1 and R2 when the stimulus is zero. Thus, if it is desired to measure the voltage across R5, the circuitry of the present invention can be used to provide a proportional voltage to a high resistance monitor rather than a proportional current to remote monitoring equipment with a particular internal resistance.

What is claimed is:

1. A circuit for receiving a supply voltage from a remote monitoring device having a particular internal resistance and for presenting a resistance to said monitoring device to cause a current to be delivered thereto that is linearly proportional to displacement of a movable member from an initial unstimulated position, said circuit comprising a pair of terminals for receiving said supply voltage: an elongate resistive element having a pair of opposed ends and being comprised of a thin layer of conductive material extending in the direction of movement of said movable member said element being connected at a first end thereof with the first one of the terminals and at the second end thereof with the second one of said terminals; a contactor including means for fixedly connecting it to said movable member for movement therewith and having a first segment arranged for sliding contact with said resistive element; a fixed conductive member said contactor having a second segment arranged for sliding contact with said fixed conductive member; a transistor connected between said conductive member and said first terminal with the base of the transistor being connected to the conductive member and the current input of the transistor being connected to the first terminal; and a resistor connected between the current output of the transistor and said second terminal whereby movement of said movable member from its unstimulated position will cause a current to flow between said terminals which is linearly proportional to the amount of movement of said movable member and the contactor carried thereby.

2. A circuit according to claim 1 wherein said resistive element comprises a layer of conductive material which is dimensionally non-uniform in said direction of movement of the movable member so that the incremental changes in the resistance value of the resistive element along said direction are non-uniform.

3. A circuit according to claim 2 wherein said resistive element is tapered in said direction of movement of the movable member.

4. A circuit according to claim 2 including means connected between the second end of the resistive element and the second terminal for providing a threshold voltage to the base of the transistor sufficient to trigger the transistor upon any movement of the movable member from its initial position.

5. A circuit according to claim 4 wherein said means connected between the second end of the resistive element and the second terminal comprises a second resistor and a second transistor connected in parallel.

6. A circuit according to claim 2 wherein said transistor comprises a pair of transistors with the base of one transistor being connected to the current input of the other transistor.

7. A circuit according to claim 6 wherein said pair of transistors include a PNP transistor having its emitter connected to said first terminal and its collector connected to said resistor and a NPN transistor having its collector connected to the base of the PNP transistor, its emitter connected to said resistor, and its base connected to said conductive member.

8. A circuit according to claim 6 including a current-limiting resistor connected between said first end of said resistive element and said first terminal.

9. A circuit according to claim 2 including a current-limiting resistor connected between said first end of said resistive element and said first terminal.

10. A circuit according to claim 1 including means connected between the second end of the resistive element and the second terminal for providing a threshold voltage to the base of the transistor sufficient to trigger the transistor upon any movement of the movable member from its initial position.

11. A circuit according to claim 10 wherein said means connected between the second end of the resistive element and the second terminal comprises a second resistor and a second transistor connected in parallel.

12. A circuit according to claim 10 wherein said transistor comprises a pair of transistors with the base of one transistor being connected to the current input of the other transistor.

13. A circuit according to claim 1 including a second resistive element comprised of a thin layer of conductive material extending in the direction of movement of said movable member, said second resistive element being connected in series with said resistor, a second contactor having means for fixedly connecting it to said movable member for movement therewith and having a first segment arranged for generally minimal contact with said second resistive element, a second fixed conductive member, said second contactor having a second segment arranged for contact with said second fixed conductive member, and a current-limiting resistor connected between said first end of the first resistive element and said first terminal, both of the resistive elements being dimensionally uniform in the direction of movement of the movable member.

14. A circuit according to claim 13 including means connected between the second end of the first resistive element and the second terminal for providing a threshold voltage to the base of the transistor sufficient to trigger the transistor upon any movement of the movable member from its initial position.

15. A circuit for receiving a supply voltage from a remote monitoring device having a particular internal resistance and for presenting a resistance to said monitoring device to cause a current to be delivered thereto that is linearly proportional to displacement of a movable member from an initial unstimulated position, said circuit comprising a pair of terminals for receiving said supply voltage; first and second elongate resistive elements each comprised of a thin layer of conductive material extending and being dimensionally uniform in the direction of movement of said movable member, each element having a pair of opposed ends, the first resistive element being connected at a first end thereof with a first one of the terminals and at the second end thereof with the second of said terminals; first and second contactors each including means for fixedly connecting it to said movable member for movement therewith and each having a first segment arranged for sliding contact with the respective first and second resistive elements; first and second fixed conductive members, said first and second contactors each having a second segment arranged for sliding contact with the respective first and second fixed conductive members; a transistor connected between the first conductive member and said first terminal with the base of the transistor being connected to the first conductive member and the current input of the transistor being connected to the terminal; a resistor connected between the current output of the transistor and said second terminal, said second resistive element being connected in series with said resistor, and said second fixed conductive member being connected to a first end of said second resistive element whereby movement of said movable member from its unstimulated position causes a current to flow between said terminals which is linearly proportional to the amount of movement of said movable member and the first and second contactors carried thereby.

16. A circuit according to claim 15 including means connected between the second end of the first resistive element and the second terminal for providing a threshold voltage to the base of the transistor sufficient to trigger the transistor upon any movement of the movable member from its initial position.

17. A circuit according to claim 16 wherein said means connected between the second end of the first resistive element and the second terminal comprises a second resistor and a second transistor connected in parallel.

18. A circuit according to claim 16 wherein said transistor comprises a pair of transistors with the base of one transistor being connected to the current input of the other transistor.

19. A circuit according to claim 18 wherein said pair of transistors include a PNP transistor having its emitter connected to said one terminal and its collector connected to said resistor and a NPN transistor having its collector connected to the base of the PNP transistor, its emitter connected to said resistor, and its base connected to said first conductive member.

* * * * *